(12) United States Patent
Olson

(10) Patent No.: US 7,681,927 B2
(45) Date of Patent: Mar. 23, 2010

(54) LOW PRESSURE FITTING

(75) Inventor: Darwin C. Olson, Perrysburg, OH (US)

(73) Assignee: Eaton Corporation, Cleveland, OH (US)

( * ) Notice: Subject to any disclaimer, the term of this patent is extended or adjusted under 35 U.S.C. 154(b) by 284 days.

(21) Appl. No.: 10/963,891

(22) Filed: Oct. 13, 2004

(65) Prior Publication Data

US 2005/0046185 A1    Mar. 3, 2005

Related U.S. Application Data

(63) Continuation-in-part of application No. 10/141,882, filed on May 10, 2002, now Pat. No. 6,854,771.

(51) Int. Cl.
*F16L 19/00* (2006.01)
(52) U.S. Cl. .................. 285/353; 285/357; 285/384
(58) Field of Classification Search ......... 285/276–277, 285/305, 307, 321, 353, 356–357, 384
See application file for complete search history.

(56) References Cited

U.S. PATENT DOCUMENTS

| | | | |
|---|---|---|---|
| 2,084,431 A | 6/1937 | Catley | |
| 2,506,722 A | 5/1950 | Kuehn et al. | |
| 2,591,514 A | 4/1952 | Courtot | |
| 2,690,895 A | 10/1954 | Barcus | |
| 2,944,840 A | 7/1960 | Wiltse | |
| 3,294,118 A | 12/1966 | Wieden et al. | |
| 3,317,220 A * | 5/1967 | Bruning | 285/1 |
| 3,474,810 A * | 10/1969 | Welsh | 137/75 |
| 3,479,068 A | 11/1969 | Brittain | |
| 3,540,760 A | 11/1970 | Miller | |
| 3,565,100 A | 2/1971 | Pfleger | |
| 3,593,962 A | 7/1971 | Sullivan | |
| 3,637,239 A | 1/1972 | Daniel | |
| 4,281,601 A | 8/1981 | Overman | |
| 4,316,600 A | 2/1982 | Parise et al. | |
| 4,407,482 A | 10/1983 | Daghe et al. | |
| 4,565,392 A | 1/1986 | Vyse | |
| 4,580,816 A | 4/1986 | Campbell et al. | |
| 4,603,886 A | 8/1986 | Pallini, Jr. et al. | |
| 4,645,245 A * | 2/1987 | Cunningham | 285/321 |
| 4,690,436 A * | 9/1987 | Hehl | 285/321 |
| 4,783,100 A | 11/1988 | Klein | |
| 4,978,147 A | 12/1990 | Henderson, Jr. et al. | |
| 5,110,088 A | 5/1992 | Shih | |
| 5,344,119 A | 9/1994 | Wang | |
| 5,433,410 A | 7/1995 | Foltz | |
| 5,433,485 A * | 7/1995 | Austin et al. | 285/39 |
| 5,570,910 A | 11/1996 | Highlen | |

(Continued)

*Primary Examiner*—Aaron M Dunwoody
*Assistant Examiner*—Fannie Kee
(74) *Attorney, Agent, or Firm*—Sonū N. Weaver

(57) ABSTRACT

A fitting is provided that includes a receptacle having an inner wall forming a female member. The inner wall includes a shoulder and a land. A male member is received in the female member with a gap therebetween. The male member includes an outwardly opening groove. An O-ring is seated between the outwardly opening groove in the male member and the shoulder and the land of the receptacle to prevent removal of the male member from the receptacle. The outwardly opening groove, the shoulder and the land are configured such that compression of the O-ring is sufficient to prevent removal of the male member from the female member.

5 Claims, 17 Drawing Sheets

U.S. PATENT DOCUMENTS

| | | |
|---|---|---|
| 5,671,955 A | 9/1997 | Shumway |
| 5,687,951 A | 11/1997 | Bamberger et al. |
| 5,826,920 A | 10/1998 | Bartholomew |
| 5,845,944 A | 12/1998 | Enger et al. |
| 5,911,404 A | 6/1999 | Cheng |
| 6,386,596 B1 | 5/2002 | Olson |

* cited by examiner

US 7,681,927 B2

LOW PRESSURE FITTING

RELATED APPLICATIONS

This application is a continuation-in-part of U.S. patent application Ser. No. 10/141,882 filed on May 10, 2002.

BACKGROUND OF THE INVENTION

1. Field of the Invention

The present invention relates to low pressure fittings. More particularly, the present invention relates to low pressure fittings such as low pressure couplings and low pressure valves.

2. Background of the Invention

There is a constant need for fittings used to convey and contain fluids. Since there are millions of these fittings used in millions of devices, it is desirable to configure these fittings so that they are both low in cost and reliable. Exemplary of such fittings are low pressure quick-connect fittings, which have replaced threaded fittings in thousands of applications, and valves which vent devices such as pressurized air containers and provide liquid drains for containers. With respect to keeping costs of such fittings as low as possible, there are needs for designs which can be machined, molded or end formed. It is also desirable to have components which are easy and inexpensive to manufacture and which do not require substantial changes in manufacturing know-how.

In configuring relatively simple devices, it is also desirable to use components and materials which have been extensively tested and have capabilities which are understood so that the limits of reliability are readily understood. This allows a designer and manufacturer to avoid over designing components so as to minimize manufacturing costs and perhaps spend manufacturing dollars on other aspects of the device using the fitting.

SUMMARY OF THE INVENTION

A fitting is provided that includes a receptacle having an inner wall forming a female member. The inner wall includes a shoulder and a land. A male member is received in the female member with a gap therebetween. The male member includes an outwardly opening groove. An O-ring is seated between the outwardly opening groove in the male member and the shoulder and the land of the receptacle to prevent removal of the male member from the receptacle. The outwardly opening groove, the shoulder and the land are configured such that compression of the O-ring is sufficient to prevent removal of the male member from the female member.

BRIEF DESCRIPTION OF THE DRAWINGS

Various other features of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
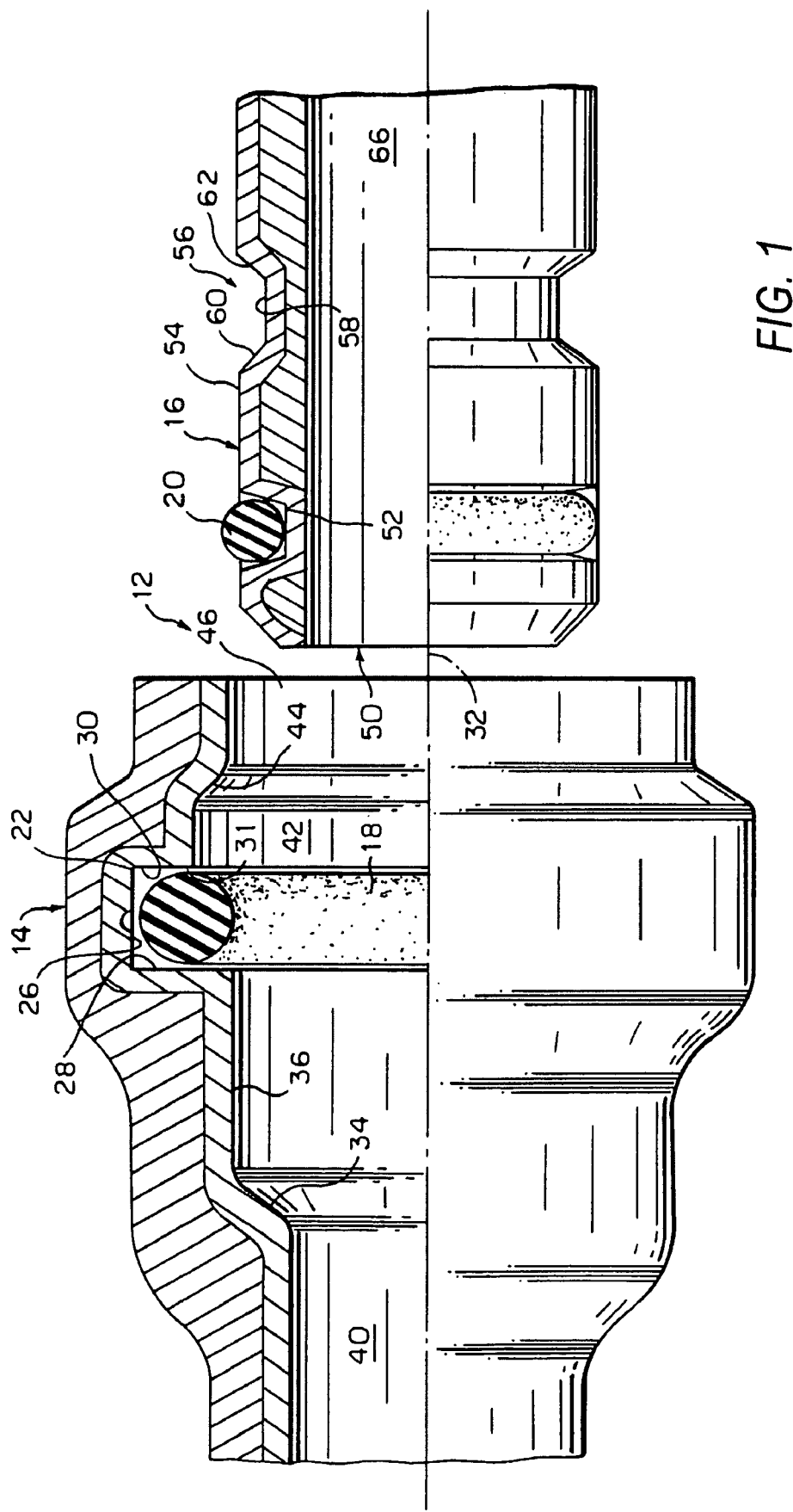
FIG. 1 is a side elevation, in partial cross-section, of female and male components of a first embodiment of a quick connect coupling prior to coupling the components.

Referring now to FIG. 1 there is shown a first embodiment 12 of a quick connect coupling in accordance with the present invention having as components a receptacle or female member 14, a male member 16, a locking O-ring 18 and primary sealing O-ring 20.

Initially, the female member 14 has the locking O-ring 18 axially positioned in its relaxed state in an inwardly opening groove 22. The groove 22 has a floor 26 radially extending to side walls 28 and 30, the wall 30 terminating in an annular edge 31. Wall 28 begins closer to the axis 32 of the female member 14 and has a wider surface area than the wall 30. Inboard of the wall 28 there is a frusto-conical stop surface 34 extending from inner cylindrical land 36 of the female member 14 to a tubular member or portion 40, which may be a tube formed integrally or unitarily with the female member 14.

Extending forwardly from front wall 30 of the inwardly opening groove 22 is a second cylindrical land 42 which has a diameter greater than the first cylindrical land 42 and an axial extent substantially less than the first cylindrical land. The second cylindrical land 42 joins a frusto-conical surface 44 which extends radially inward toward the axis 32 of the female member 14. The frusto-conical shoulder 44 joins a cylindrical inlet surface 46 which has an inner diameter substantially the same as the inner diameter of the first cylindrical land 36.

The male member 16 has a frusto-conical nose portion 50 and an outwardly (or exteriorly) opening groove 52 in which the primary sealing O-ring 20 is seated. Groove 52 is joined by a cylindrical portion 54 to a second outwardly opening groove 56. The second outwardly opening groove 56 has a cylindrical floor 58 and first and second frusto-conical walls 60 and 62 which make the groove 56 concave by flaring away from the cylindrical floor 56. The male member 16 then continues as a tube 66 which may be integral or unitary with the male member 16, and in a usual application, has a diameter equal to the diameter of the tube 40 with which the female member 14 is joined.

Figure 2:
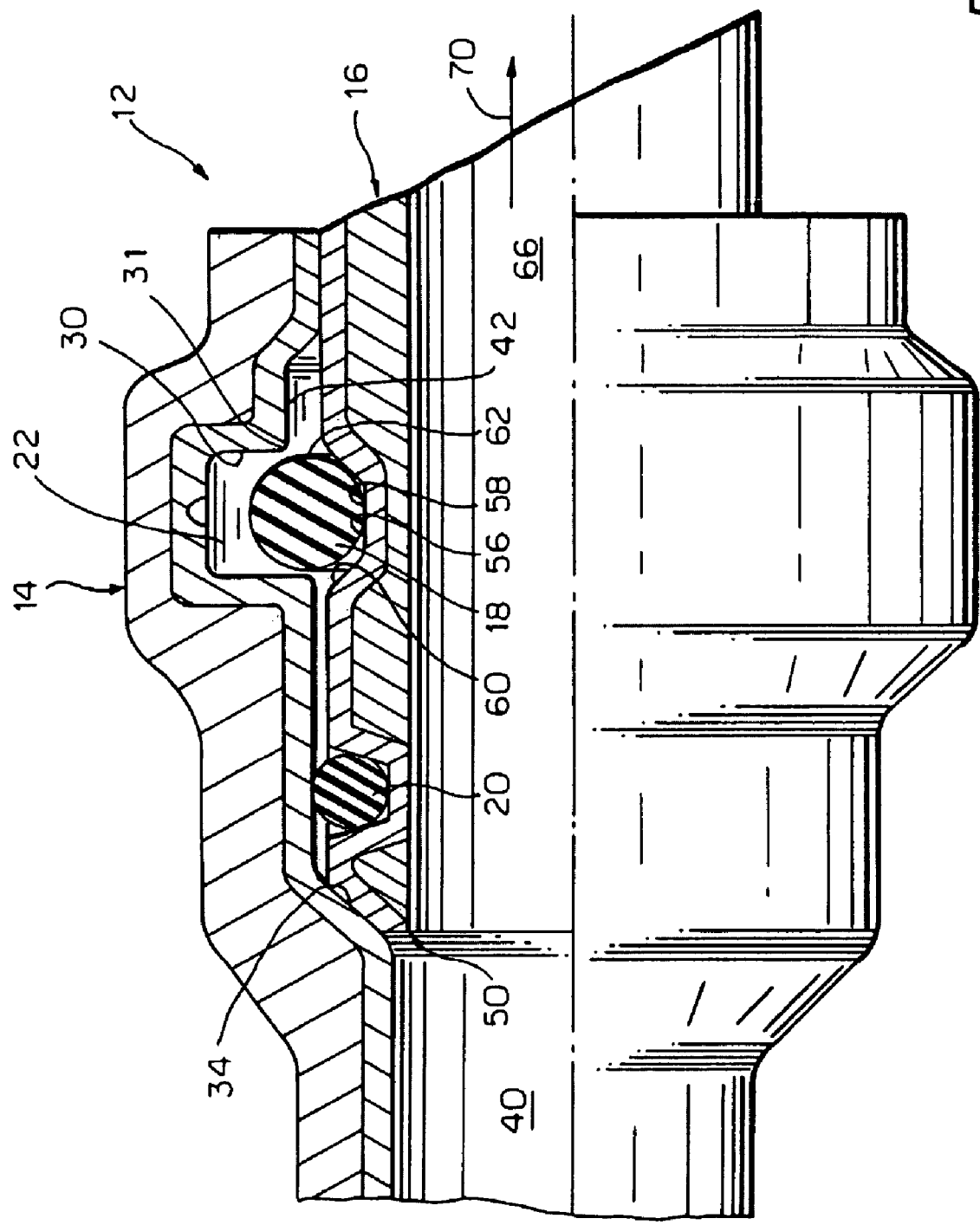
FIG. 2 is a side elevation, in partial cross-section, of the quick connect coupling of FIG. 1 showing the components being joined.

Referring now to FIG. 2 where the male member 16 is shown being inserted into the female member 14, it is seen that nose 50 of the male member 16 dilates the elastic O-ring 18 allowing the male member 16 to slide into the female member 14 until the frusto-conical nose 50 abuts the frusto-conical surface 34 on the female member. At this point, the O-ring 18, which has expanded against its elasticity further into the inwardly opening groove 22, then contracts so as to seat in the outwardly opening groove 56 in male member 16.

Upon pressurizing the tube 40 connected to the female member 14, or upon pressurizing the tube 66 connected to the male member 16 so that there is pressure within the tubes, fluid pressure on the primary O-ring 20 forces the male member 16 to move with respect to the female member in the direction of arrow 70. Since the locking O-ring 18 is constrained by the outwardly opening groove 56, the O-ring is forced by the frusto-conical surface 60 to deform against the edge 31 joining the cylindrical land 42 to the second wall of the female member 14. This causes the O-ring 18 to be squeezed through a gap 72 between the edge 31 on the female member 14 and the frusto-conical surface 60 of groove 56 on the male member 16.

Figure 3:
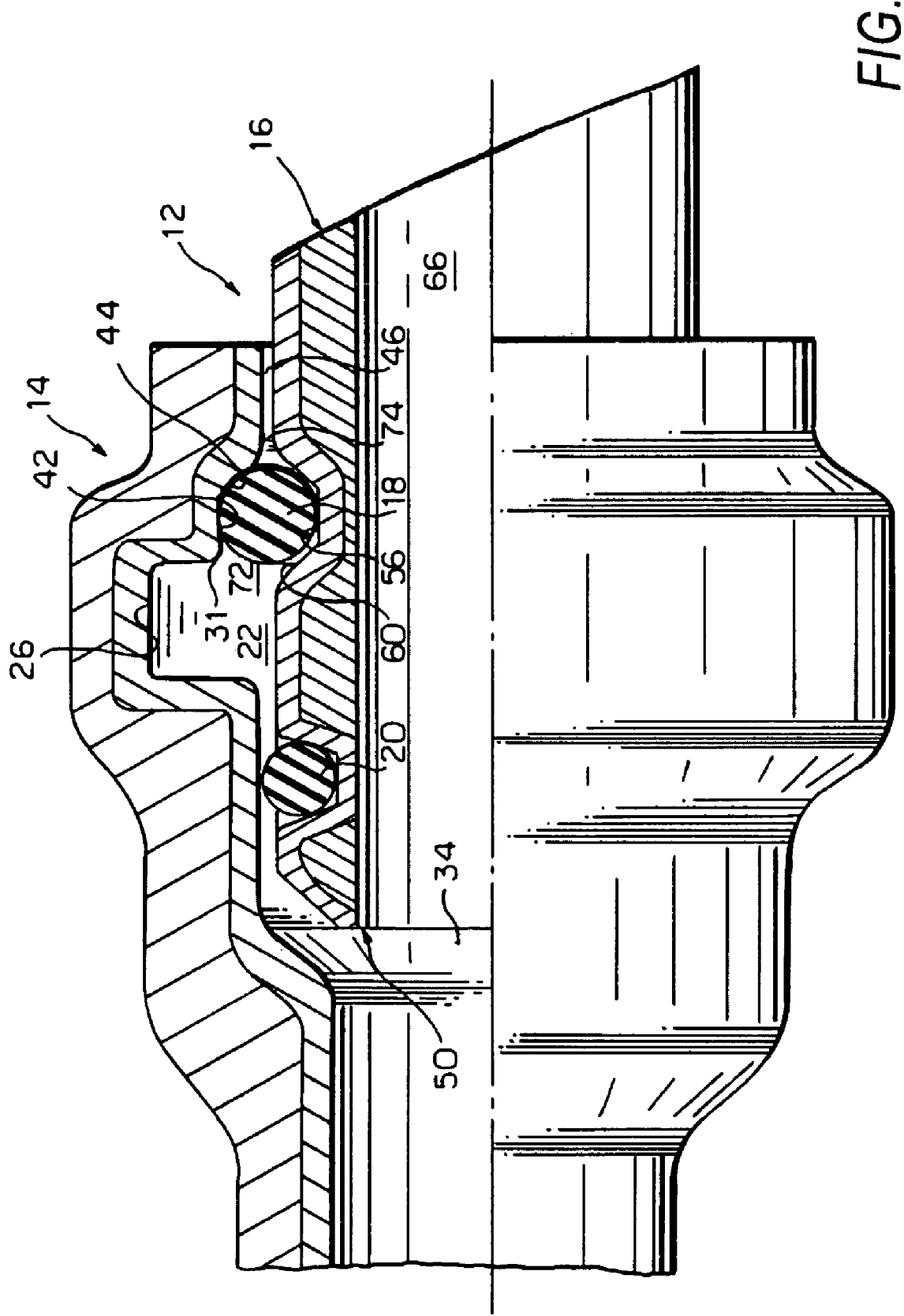
FIG. 3 is a side elevation, in partial cross-section, of the quick connect coupling of FIGS. 1 and 2 coupled together.

As is seen in FIG. 3, the locking O-ring 18 then abuts frusto-conical shoulder 44 extending from cylindrical surface 42 to the cylindrical inlet surface 46, which prevents further axial motion of the male member 16 in the direction of arrow 70. The male member 16 is then permanently locked within the female member 14.

Since the locking O-ring 18 is resilient and deformable, it forms a secondary seal that seals the gap 74 between the male member 16 and the female member 14. Accordingly, seal 18 for at least some applications is sufficient to both lock and seal the coupling 12, in which case the seal 20 may be deleted or is considered as an additional sealing O-ring supplementing the sealing action of the O-ring 18.

While utilizing pressure within the tubular portions 40 and 66 to effect coupling the male and female members 14 and 16, it should be kept in mind that locking should also be effected by simply pulling the male member 16 and female member 14 in opposite directions to move from the FIG. 2 position to the FIG. 3 position.

Figure 4:
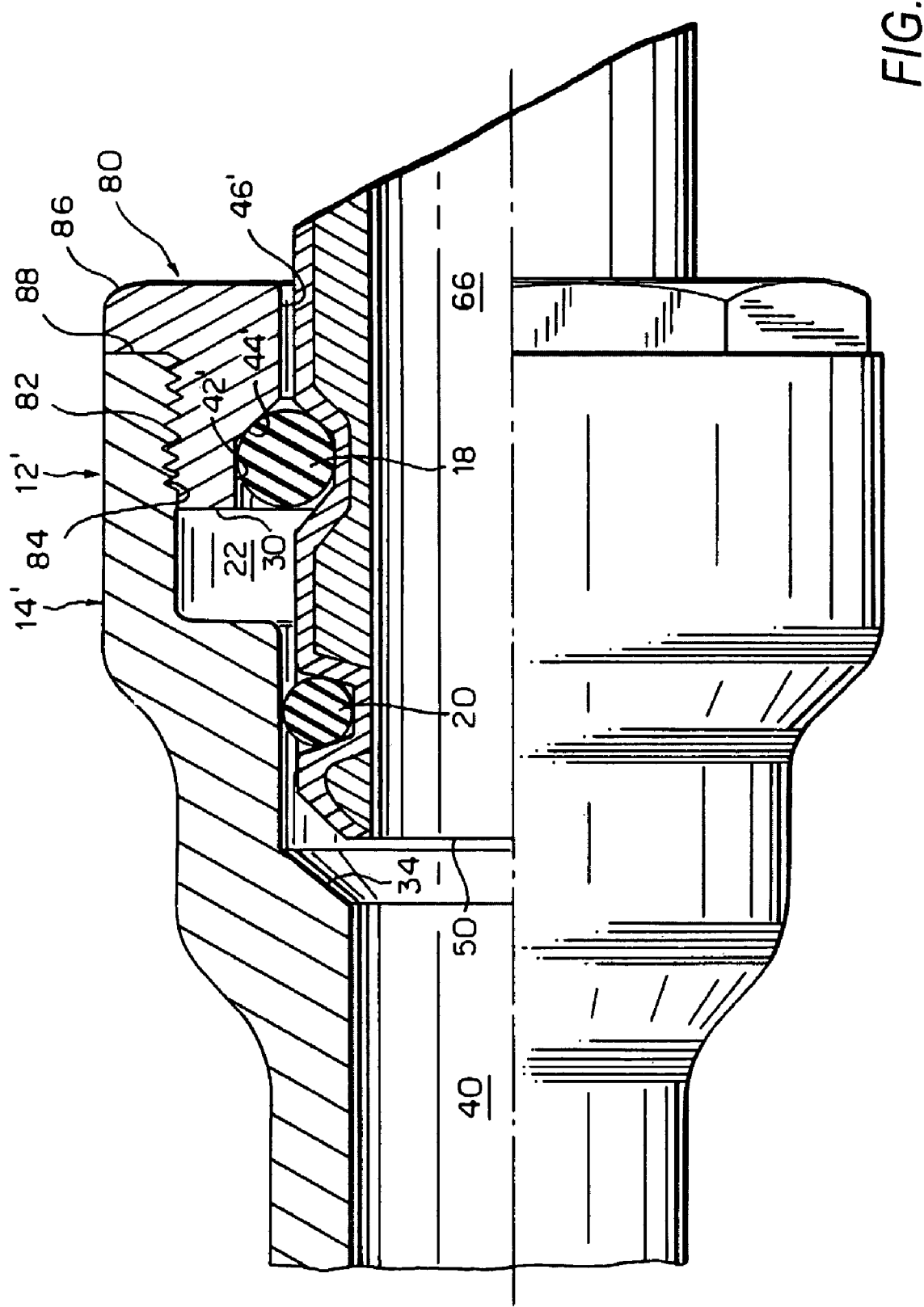
FIG. 4 is a side elevation, in partial cross-section, of another embodiment of a quick connect coupling in accordance with the present invention.
Figure 5:
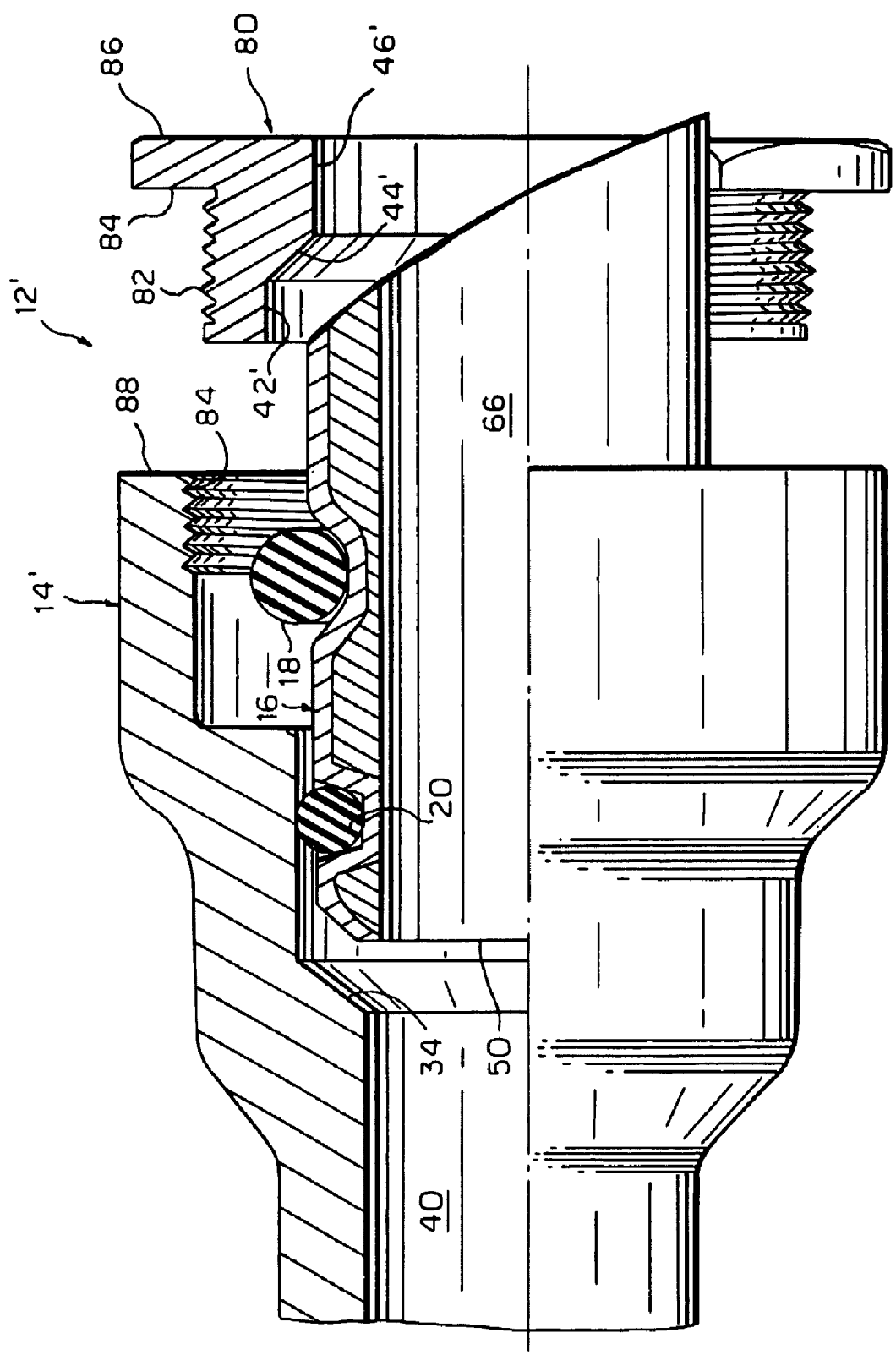
FIG. 5 is a side elevation, in partial cross-section, of the quick connect coupling of FIG. 4, but showing male and female components after decoupling.

Referring now to FIGS. 4 and 5 where a second embodiment 12' of the quick connect coupling is shown, the radial surface 30', cylindrical land 42', frusto-conical shoulder 44' and cylindrical inlet 46' form part of a stop nut 80 which has external threads 82 which thread into internal threads 84 on the female member 14'. Stop nut 80 has a radial shoulder 86 which abuts an end 88 on the female member 14'. Preferably, coupling of the female member 14' and the male member 16 is accomplished in the same manner as illustrated in FIGS. 1-3. While coupling as illustrated in FIGS. 1-3 is preferable, it is also possible to effect coupling by inserting the male member 16 into the female member 14 prior to threading the lock nut 80 into the end of the female member.

The quick-connect coupling of FIGS. 1-3 is permanent, whereas the coupling of FIGS. 4 and 5 can be decoupled by removing the stop nut 80 so that the locking O-ring 18 is no longer restrained axially by the frusto-conical shoulder 44'.

The female member 14, which can be configured as a receptacle or port as well as a tube, may be machined or molded as is the case with the male member 16. Optionally, the female member 14 and male member 16 may be formed by stamping. The material may be metal or plastic depending on its application.

Referring now to FIGS. 6-10 where a second embodiment of the fitting is shown, it is seen that the fitting is now configured as a valve assembly 100 comprising three main parts, i.e., a valve stem 102, a valve body 104 and an O-ring 106. The valve stem 102 comprises a male member in the form of a plug while the valve body 104 comprises a receptacle or female member.

As is seen in the elevational views, the valve body 104 has a bore 110 therethrough defined by a cylindrical inner wall. The bore 110 has a first end 112 and a second end 114. The second end 114 is relieved to provide a recess 116 having a shoulder 118. The shoulder 118 is slightly frusto-conical. The valve body 104 has exterior threads 120 thereon threading onto a container or other device, which has fluid therein, such as but not limited to pressurized air or a liquid. A hex nut flange 124 having end face 126 is unitary with the valve body 104.

The valve stem or male member 102 has an end flange 130 projecting radially therefrom and a shank portion 132. The shank portion 132 has outwardly opening groove 134 at second end 135 thereof and a longitudinal opening 138 in the form of an outwardly opening groove. Preferably, there are two grooves 138 disposed at 180 from one another. Grooves 138 have first end 140, which is disposed approximate the annular groove 135 and a second end 142 that communicates with a radial groove 144 in the end flange 130.

Figure 6:
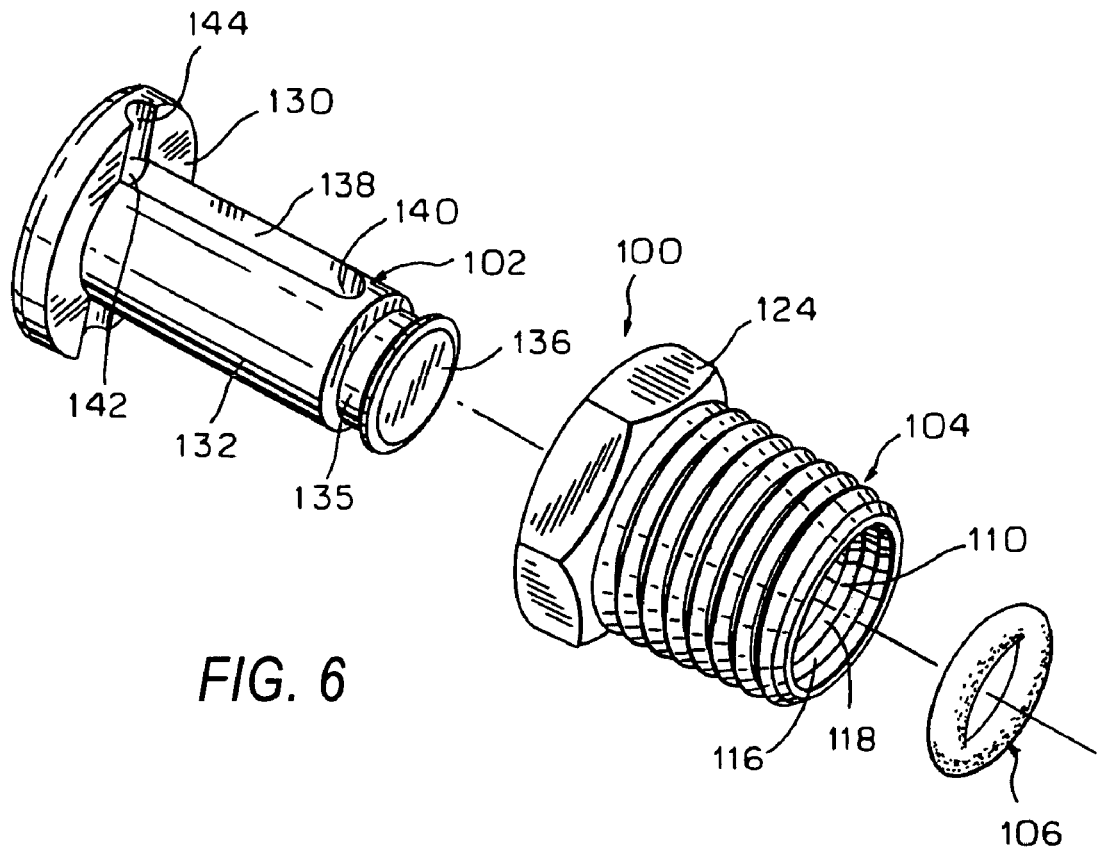
FIG. 6 is a perspective view of the components of a fitting in accordance with the present invention configured as a valve.
Figure 7:
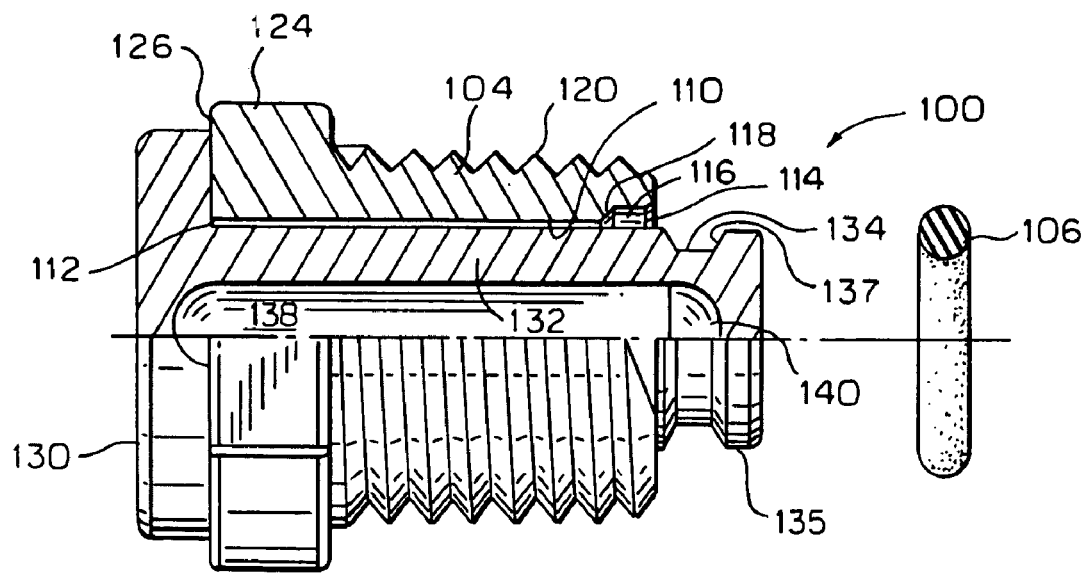
FIG. 7 is a side view, partially in elevation, of a valve in accordance with the present invention showing components of the valve prior to final assembly.

In order to assemble the valve assembly 100, the valve stem 102, valve body 104 and O-ring 106 are aligned as in FIG. 6 and partially assembled as in FIG. 7 by inserting the valve stem 102 through the bore 110 of the valve body. As is seen in FIGS. 8A and 8B, the O-ring 106 is then expanded over the end 136 of the valve stem 104 and seated in the annular groove 135.

Figure 8A:
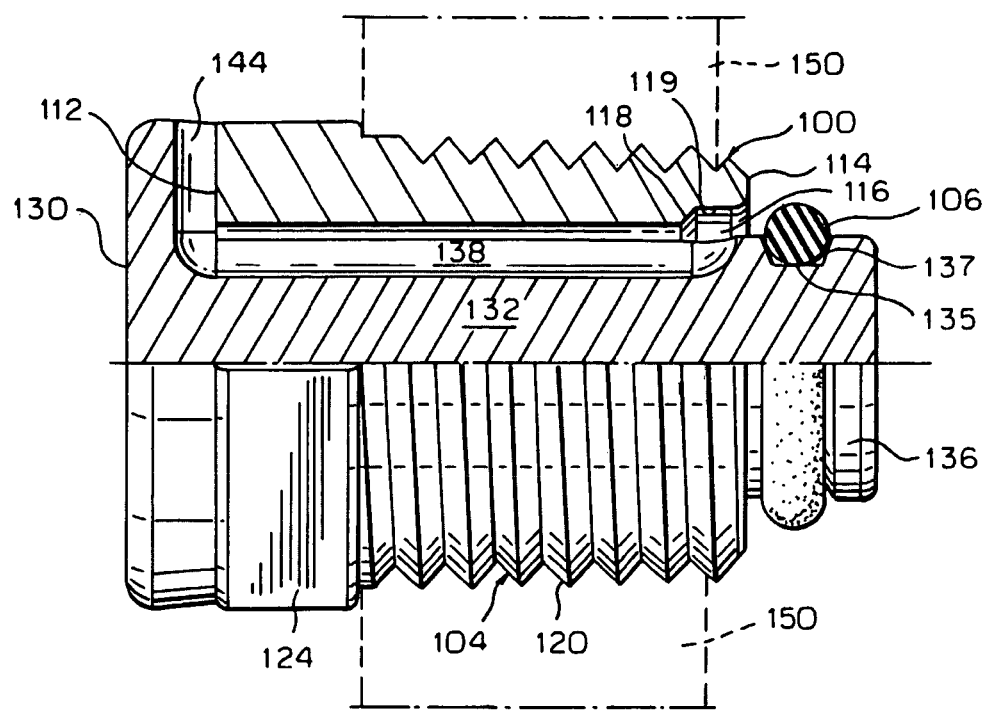
FIG. 8A is a side elevation showing the components assembled with the valve open.
Figure 8B:
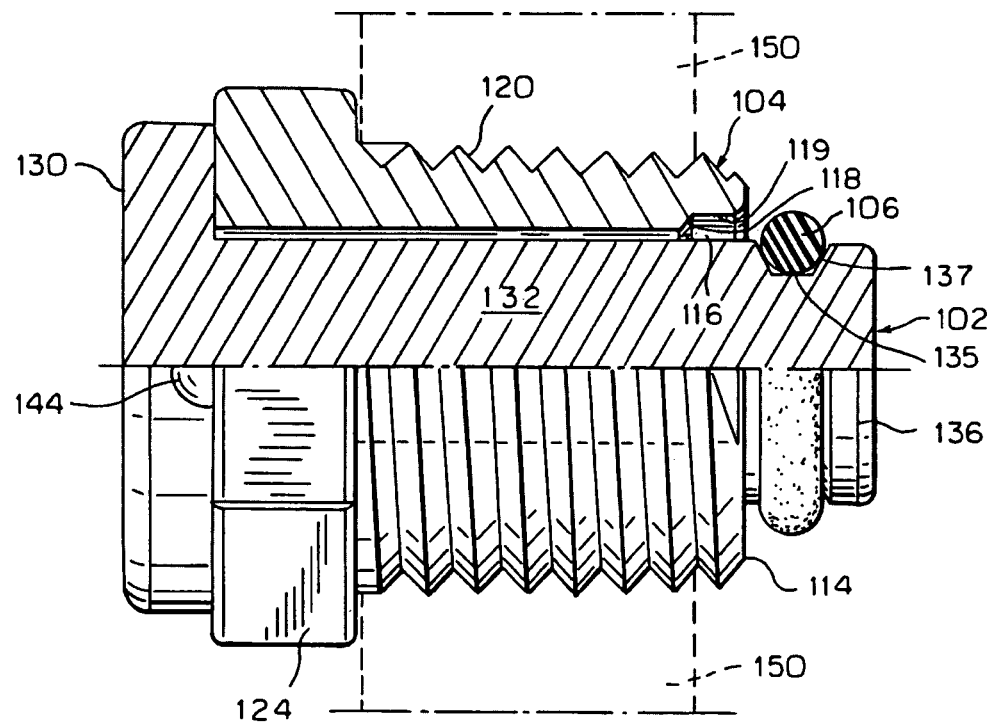
FIG. 8B is a side elevation oriented 90 to FIG. 8A.
Figure 9A:
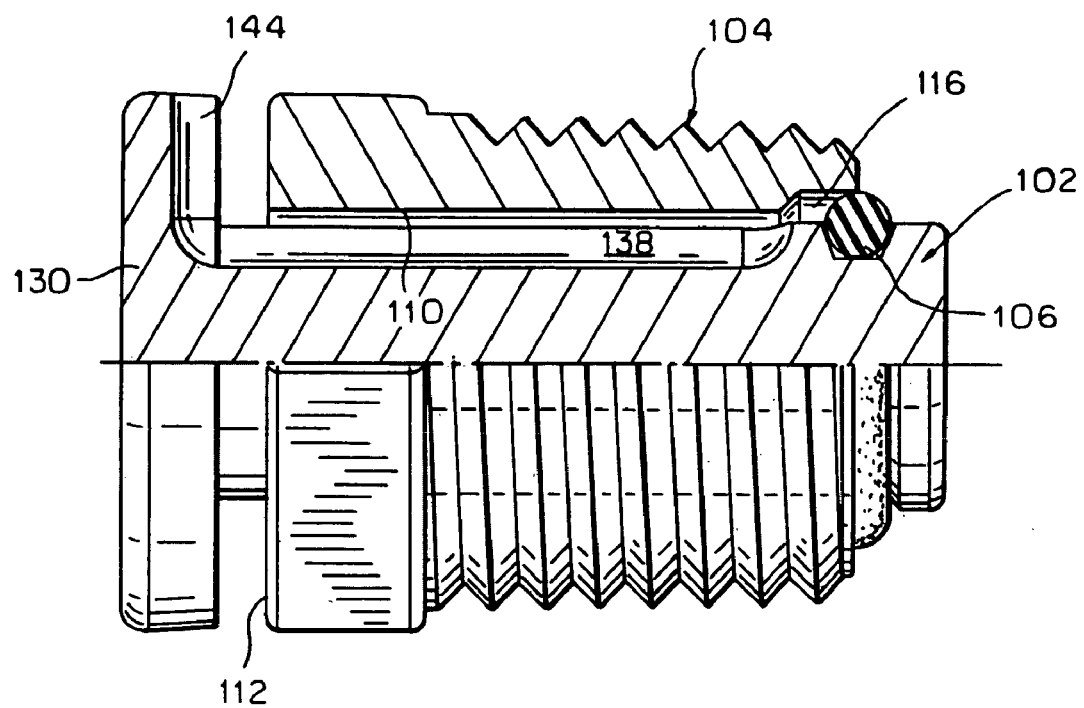
FIG. 9A is a side elevation showing the valve in an intermediate position where it is closing.
Figure 9B:
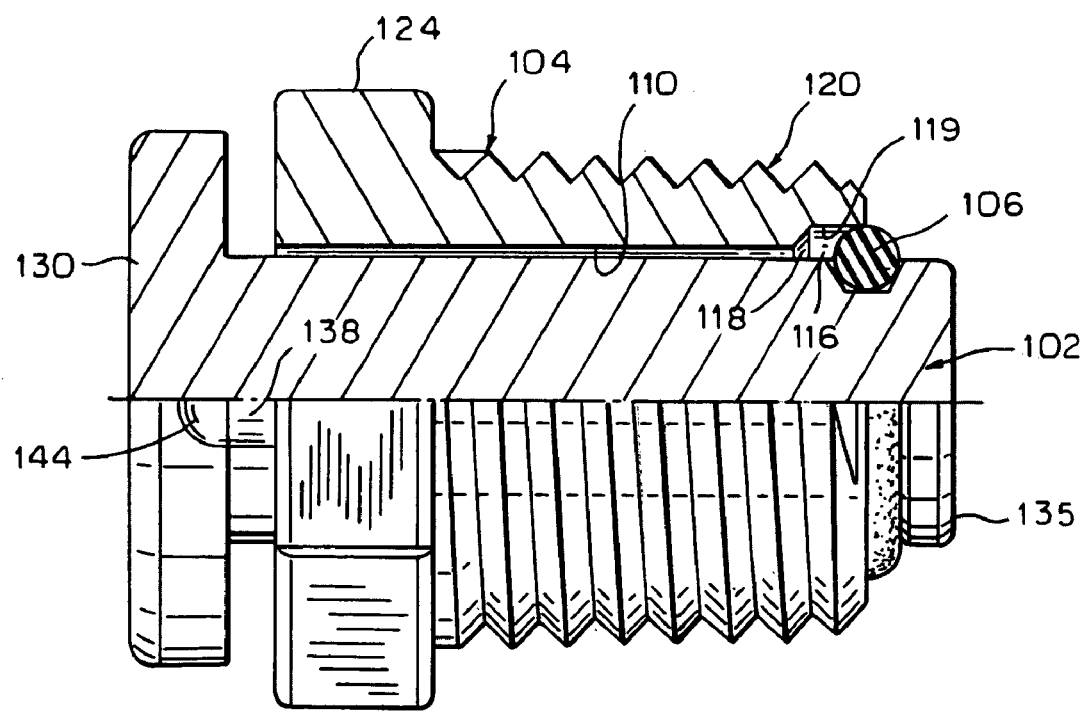
FIG. 9B is a side elevation oriented at 90 to FIG. 9A.
Figure 10A:
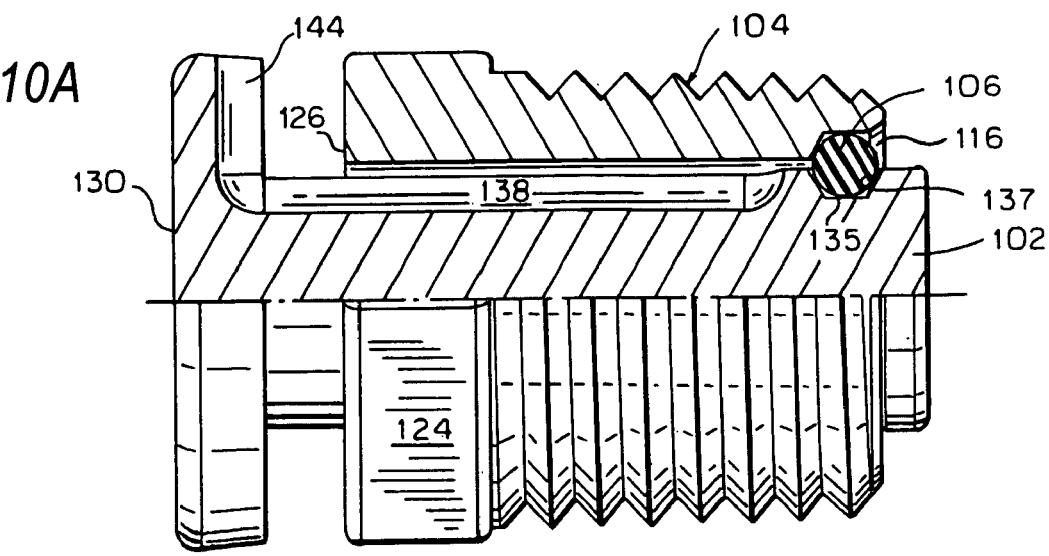
FIG. 10A is a side elevation showing the valve closed.
Figure 10B:
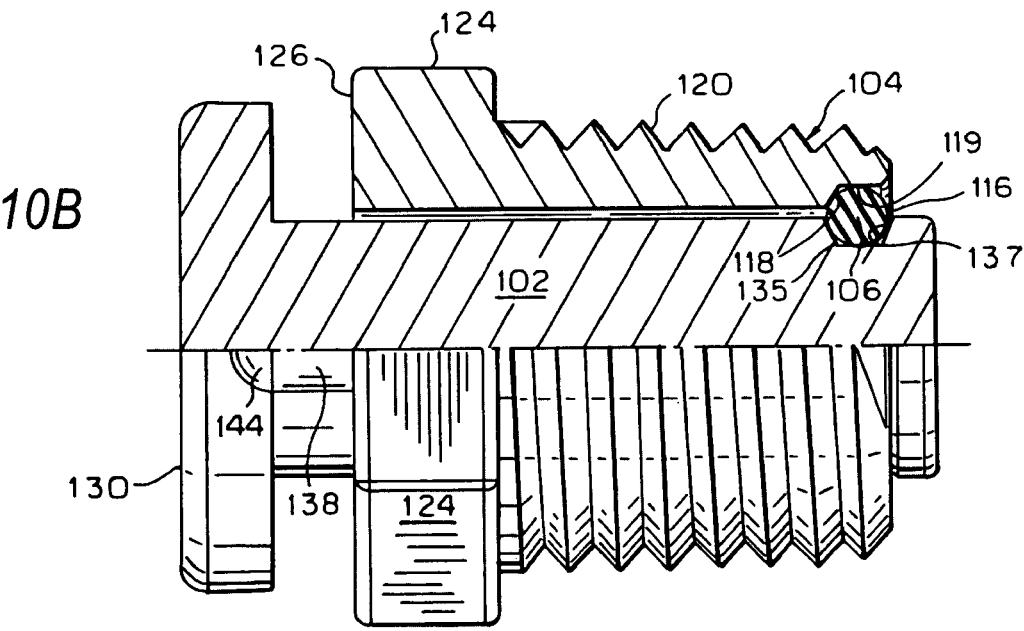
FIG. 10B is a side elevation oriented at 90 to FIG. 10A.

The valve assembly 100 shown in FIGS. 8A and 8B is then screwed into a wall 150 (shown in dotted lines) of a container or other device which has fluid therein. If the fluid is a pressurized fluid, such as compressed air, pressure against the end face 136 of the valve stem 102 will force the valve stem to move through the intermediate position of FIGS. 9A and 9B to the position of FIGS. 10A and 10B where the O-ring 106 seats against the frusto-conical shoulder 118 of the annular recess 116. The O-ring seals the gap between valve stem 102 and the wall of bore 110 by abutting and deforming against frusto-conical shoulder 118 and the cylindrical surface 119 and the annular recess 116. In addition, the O-ring 106 is pressed against the surface 137, which defines groove 135 so that the fluid behind the wall 150 does not escape through the end 140 of the gap 138.

When it is desired to relieve pressure behind the wall 150, the end flange 130 of the valve is simply pressed back against the face 126 on the valve body 104 so that the space formed by the groove 138 communicates with the space on the opposite side of the wall 150. This allows air to flow into the annular recess 116 in the valve body 114 and through the axial groove 138 in the shank 132 and radial groove 144 of the male member 102 (see FIG. 6) to exhaust air from behind the wall 150 to a lower pressure, such as that of the surrounding atmosphere. Upon repressurization, the valve stem 102 will again move from the FIGS. 8A and 8B to the FIGS. 10A and 10B position to close the valve.

Figure 11:
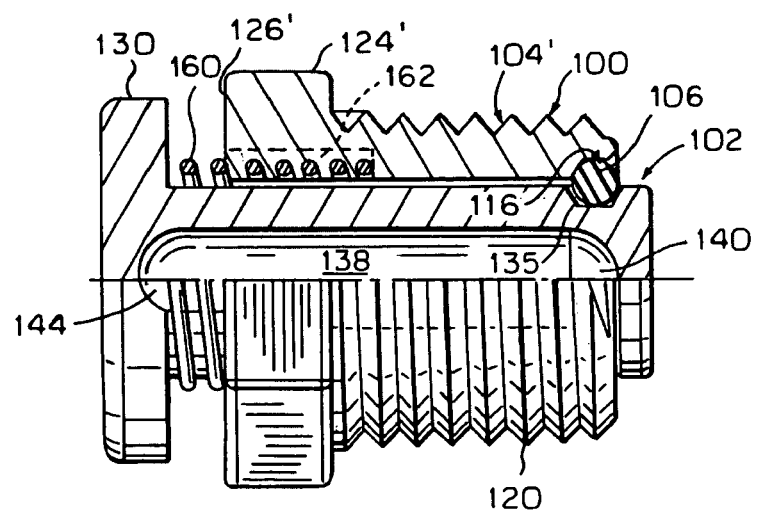
FIG. 11 is a side view of an additional embodiment of the valve of FIGS. 6-10, wherein the valve is biased to a closed position by a spring.

Referring now to FIG. 11 where an additional embodiment of the valve assembly 100' is shown, the fitting is similar to that of FIGS. 6-10 except that a coil spring 160 is disposed in an annular pocket 162 formed in valve body 104. The coil spring 160 presses against the flange 130 urging the flange to move away from the end face 126 of the valve body 104 to urge the valve assembly 100' to the closed position similar to the closed position of FIGS. 10A and 10B. Consequently, the valve 100' is automatically in the closed position. If the container is filled with water or a low pressure fluid which may not exert sufficient pressure against the valve stem 102 to urge the valve stem from its open position of FIGS. 8A and 8B to its closed position of FIGS. 10A and 10B, the spring 160 supplies the necessary force to close the valve 100'. If it is desired to vent through the valve 100', then the valve stem 102 is pressed back against the end face 126 of the valve body 104 so that the groove 138 is open to the space beyond the valve body 104 and fluid can escape through the axial groove 138 and radial groove 144 into the surrounding environment.

Referring to FIGS. 12-16, a fitting 12" according to another embodiment of the present invention is shown that is substantially similar to the embodiments illustrated in FIGS. 1-5 of the present invention with at least one exception, namely, a male member 16" of the fitting 12" does not include a sealing O-ring. Instead, a sealing O-ring 20' is received in an inwardly opening groove 22" in a female member 14". Providing the sealing O-ring 20' in the female member 14" enables the use of a larger diameter sealing O-ring that would not otherwise fit within the groove 52 of the male member 16 shown in FIGS. 1-5. Additionally, removing the sealing O-ring from the male member 16" allows groove 52 to be eliminated from the male member 16", which enables a larger bore diameter in the male member 16". Moreover, removing the sealing O-ring from the male member 16" reduces the insertion force required to couple fitting 12", since the sealing O-ring 20' does not need to pass through a locking O-ring 18' during assembly. Locating the sealing O-ring 20' within the inwardly opening groove 22" of the female member 14" also enhances the ability of the fitting 12" to support a side load.

Figure 12:
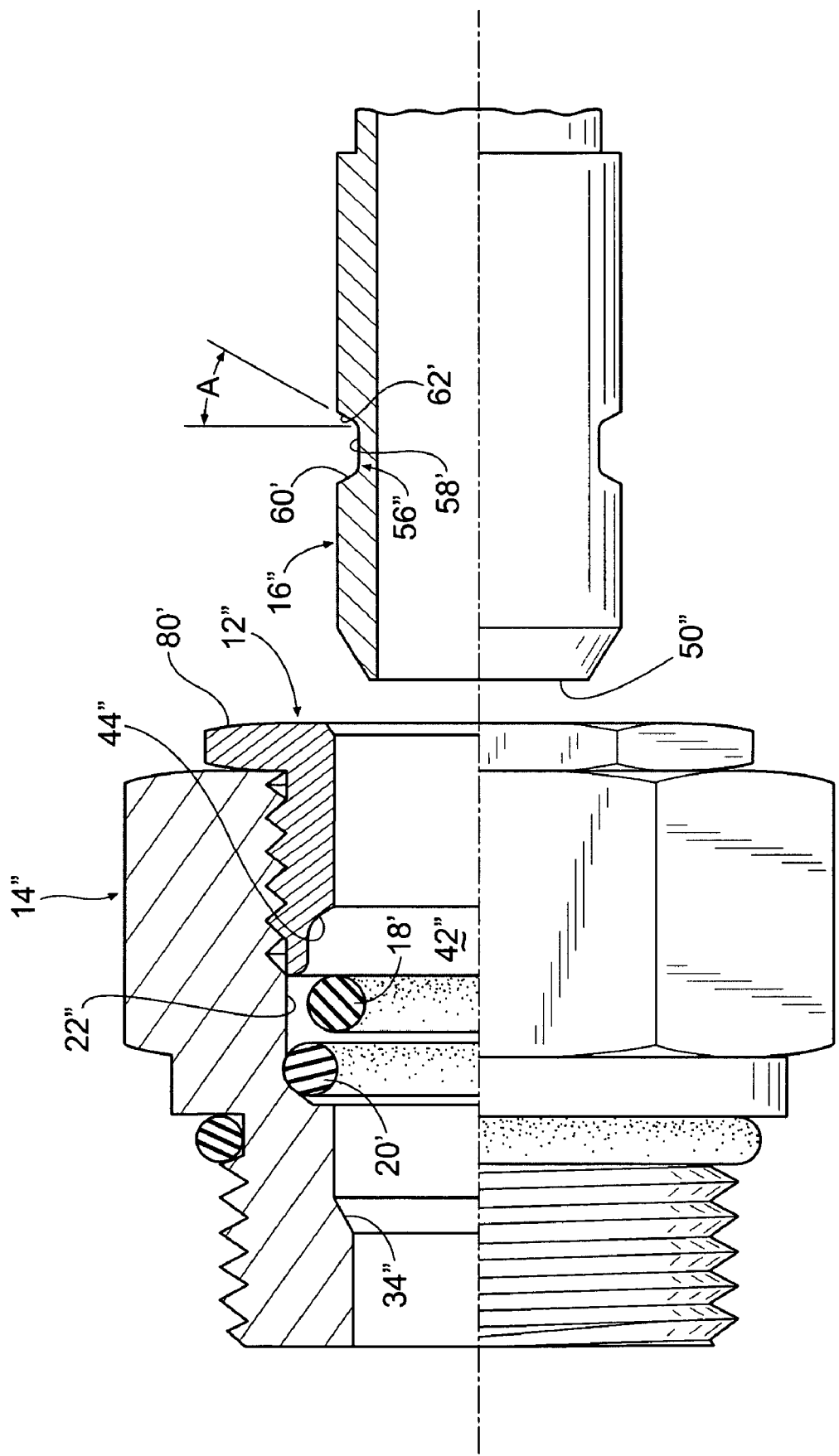
FIG. 12 is a side elevation, in partial cross-section, of female and male components according to another embodiment of a quick connect coupling prior to coupling the components.
Figure 13:
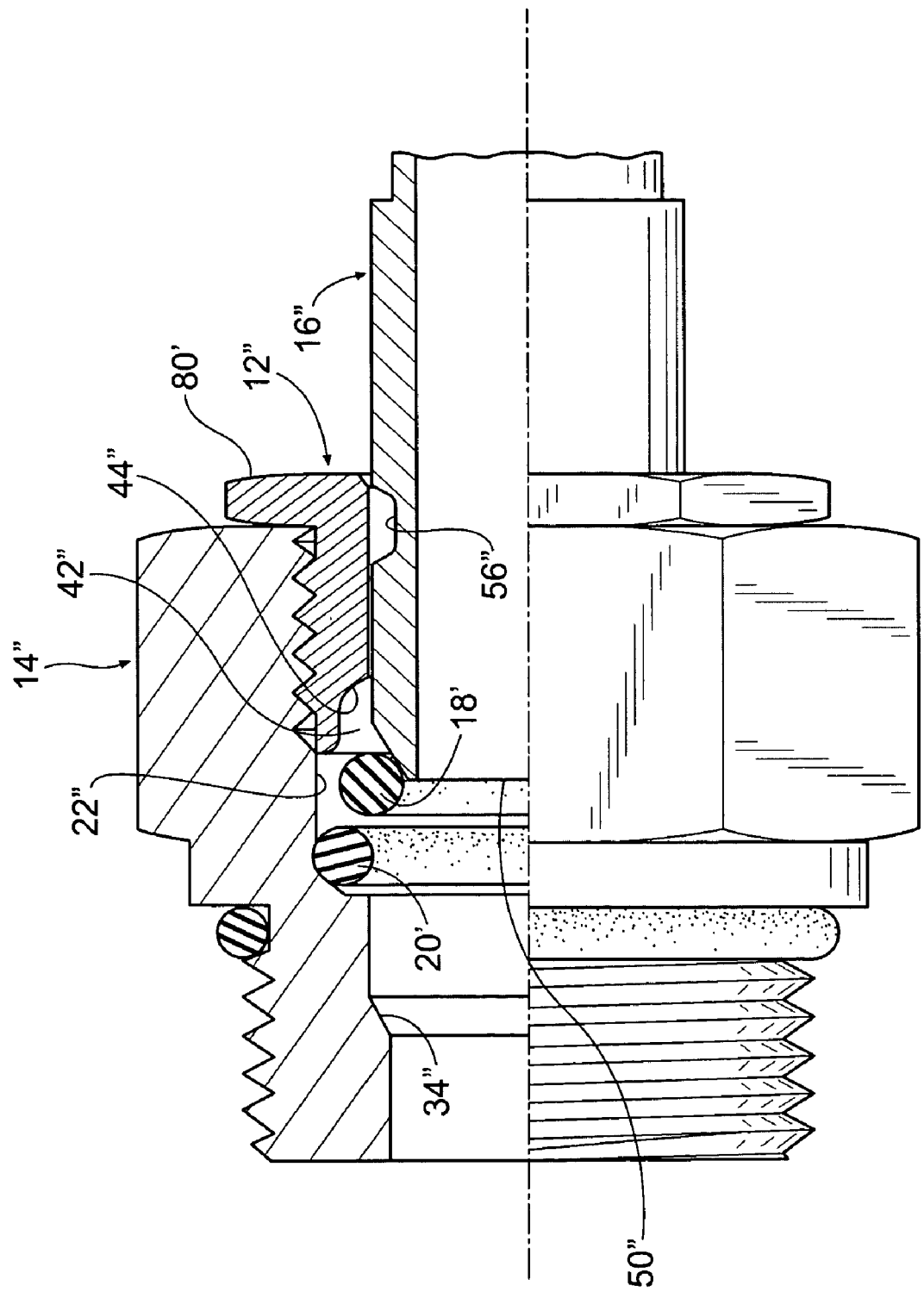
FIGS. 13-15 are side elevations, in partial cross-section, of the quick connect coupling of FIG. 12 showing the components being joined.
Figure 14:
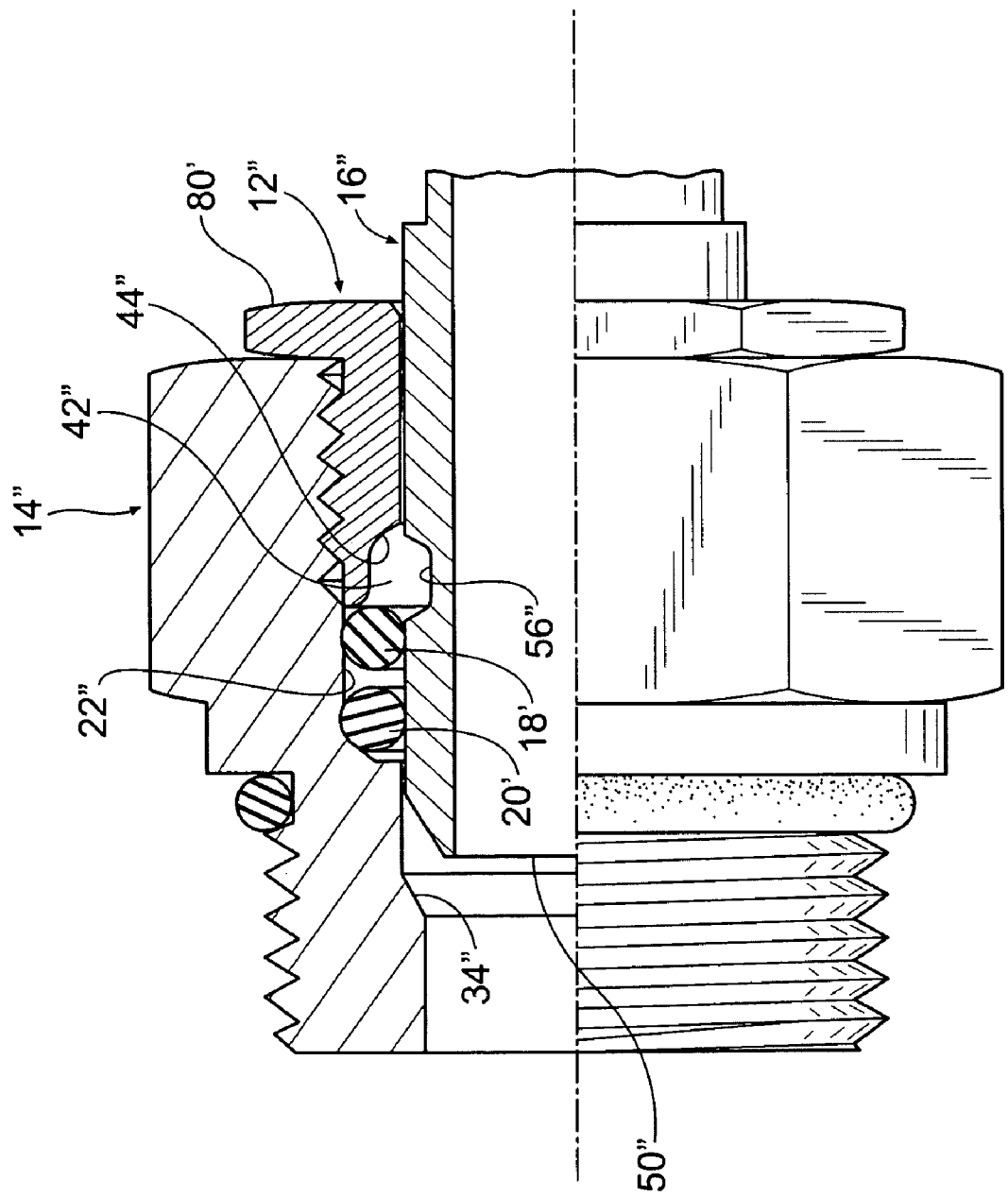
Figure 15:
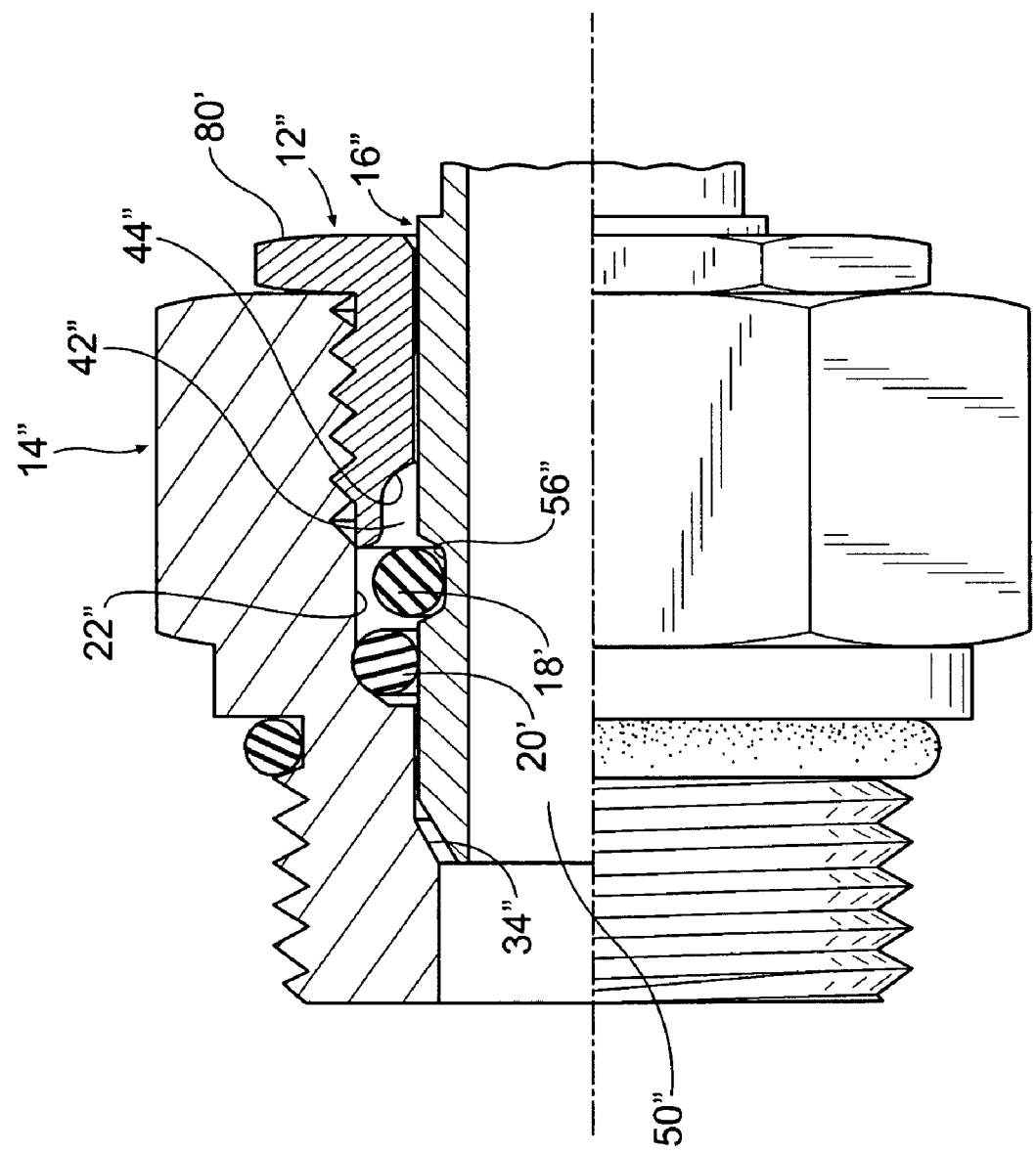
Figure 16:
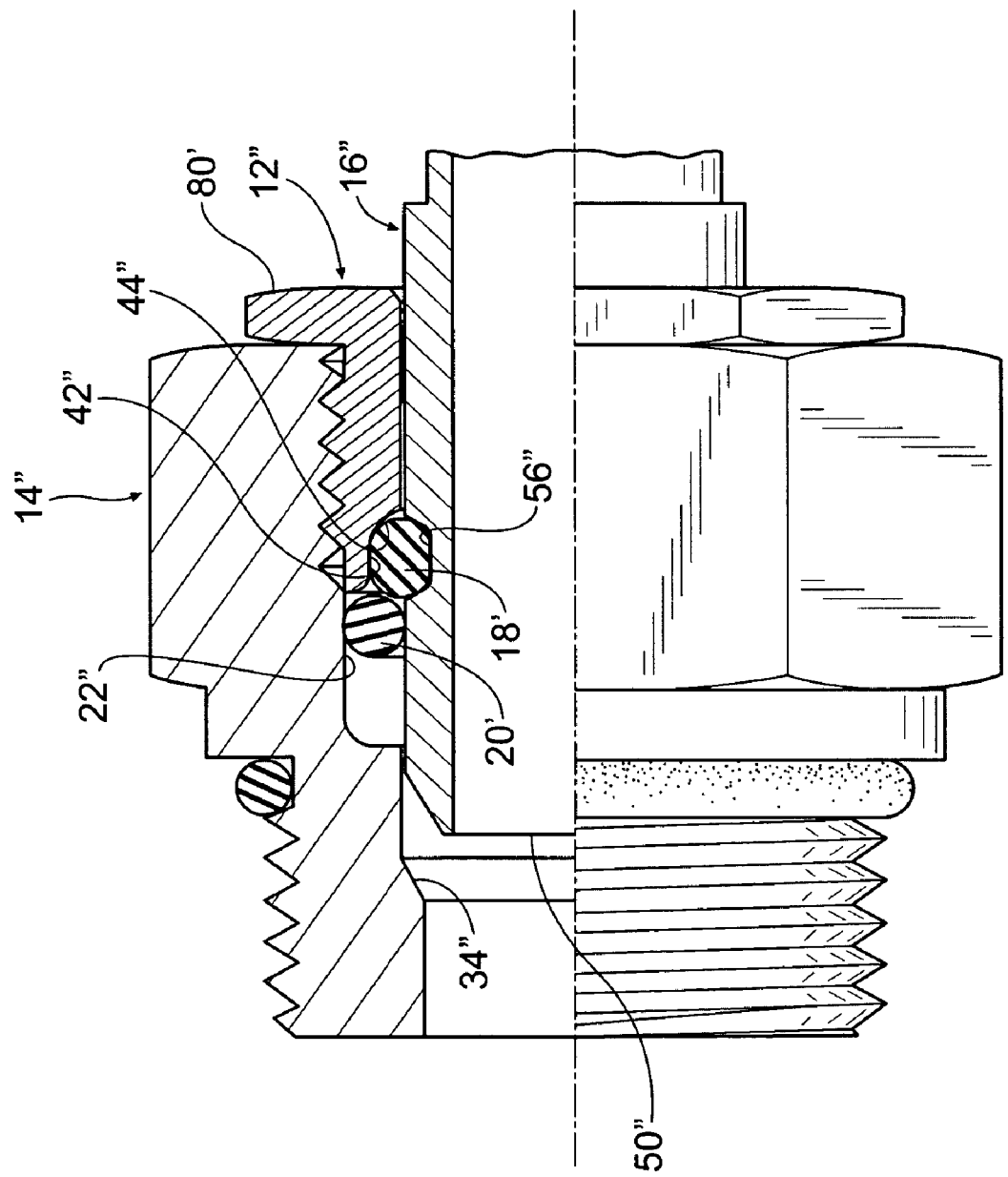
FIG. 16 is a side elevation, in partial cross-section, of the quick connect coupling of FIGS. 12-15 coupled together.

Referring to FIG. 13 where the male member 16" is shown being inserted into the female member 14", it is seen that a nose 50" of the male member 16" pushes the locking O-ring 18' against the sealing O-ring 20', centers the locking O-ring 18' and then dilates the elastic locking O-ring 18' allowing the male member 16" to slide into the female member 14'. As shown in FIG. 14, both the locking O-ring 18' and the sealing O-ring 20' expand against their elasticity further into the interiorly (or inwardly) opening groove 22". Prior to the frusto-conical nose 50" of male member 16" abutting a frusto-conical surface 34" within the female member 14", the locking O-ring 18' contracts so as to seat in an outwardly opening groove 56" in male member 16". As shown in FIG. 16, the locking O-ring 18' is squeezed between a shoulder 44" and a land 42" when a longitudinal force is applied to separate the members. While the shoulder 44" and land 42" are shown in FIGS. 12-16 as being contained in a threaded stop nut 80', it will be appreciated the shoulder 44" and land 42" may be contained within the body of the female member 14" itself, as shown in FIGS. 1-3.

As shown in FIG. 12, outwardly opening groove 56" includes a cylindrical floor 58' and first and second frusto-conical walls 60' and 62', which make the groove 56" concave by flaring away from the cylindrical floor 58'. In an embodiment, an angle A of frusto-conical walls 60' and 62' is approximately 60 degrees relative to floor 58'; however, the angle A is not necessarily limited thereto. The outwardly opening groove 56" may include corner radii between the walls 60' and 62' and the floor 58' of about one-half the diameter of the locking O-ring 18'. Similarly, the depth of the outwardly opening groove 56" may be about one-half the diameter of the locking O-ring 18' and the width of the outwardly opening groove 56" may be about the same dimension as the diameter of the locking O-ring 18'. The dimensions of the shoulder 44" and land 42" in the female member 14" may be substantially similar to the dimensions noted above with respect to the outwardly opening groove 56" in the male member 16".

In an embodiment, the hardness of the locking O-ring 18' is between about 70 and 90 durometer (Shore A), but is not necessarily limited thereto. In a non-reinforced polymer O-ring, this hardness results in a compression of between approximately 10-25%, depending on the diameter of the locking O-ring 18' and the corresponding dimensions of the outwardly opening groove 56", the shoulder 44" and land 42". The working pressure of the fitting (i.e., the predetermined pressure below the pressure that causes the male and female members to separate) is generally determined by the shear strength of the locking O-ring 18', which may be enhanced by compression of the locking O-ring. This feature is particularly useful when using non-reinforced polymer O-rings, such as elastic polymer O-rings. Accordingly, the outwardly opening groove 56", the shoulder 44" and the land 42" are configured such that compression of the locking O-ring 18' alone is sufficient to prevent removal of the male member 16" from the female member 14".

Like the embodiment shown in FIGS. 1-11, the locking O-ring 18' forms a secondary seal that seals a gap between the male member 16" and the female member 14" and inhibits the ingression of contaminants, such as dirt and other debris, into inwardly opening groove 22" of the female member 14". Accordingly, for at least some applications, the locking O-ring 18' is sufficient to both lock and seal the fitting 12", in which case the sealing O-ring 20' may be deleted or is considered as an additional sealing O-ring supplementing the sealing action of the locking O-ring 18'. The resilience of the locking O-ring 18' in the compressed state also improves the vibration resistance of the fitting 12", particularly when compared to prior art fittings that employ a split metal locking ring or spring-reinforced rubber O-ring.

Figure 17:
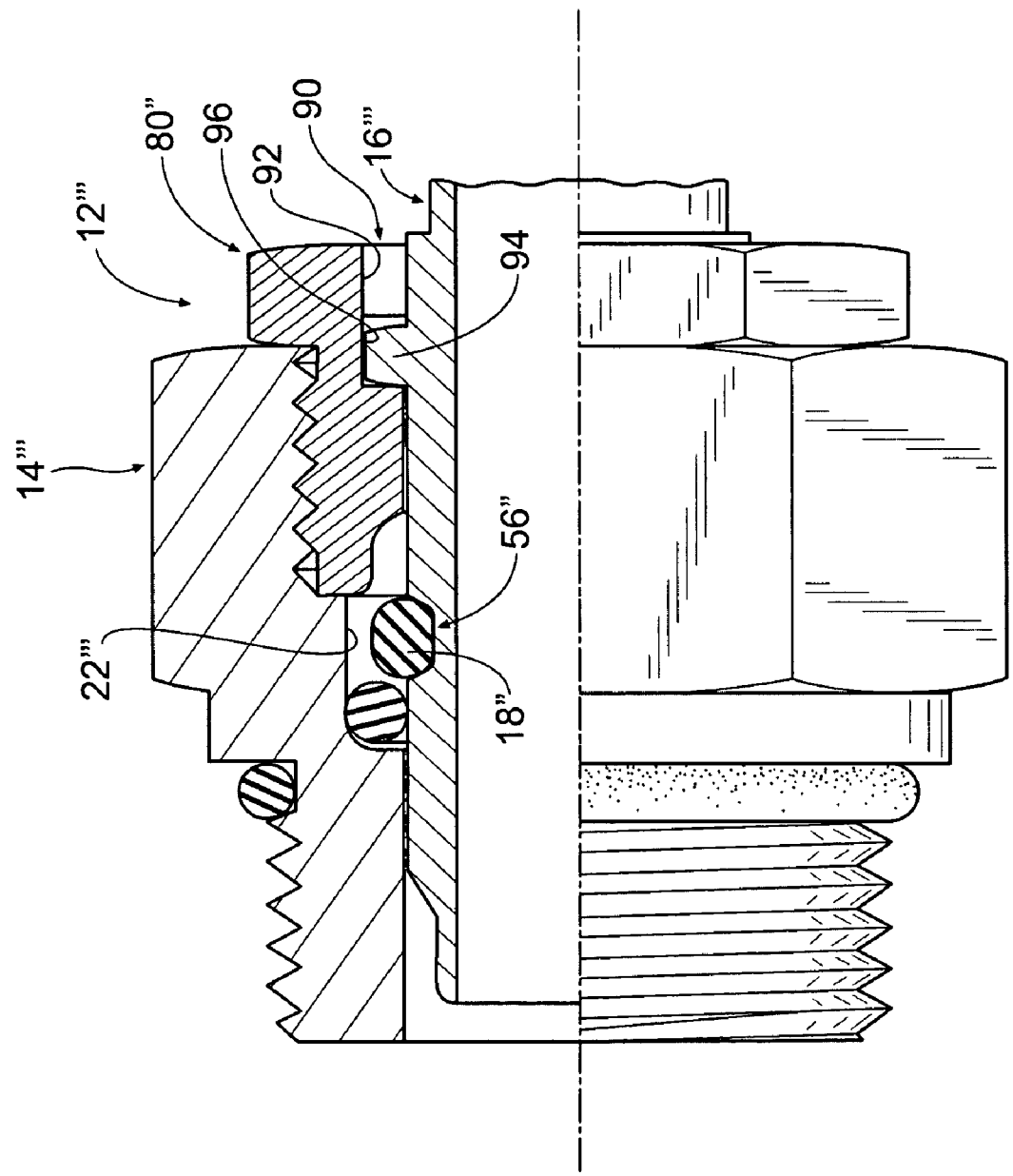
FIG. 17 is a side elevation, in partial cross-section, of female and male components according to another embodiment of a quick connect coupling.
Figure 18:
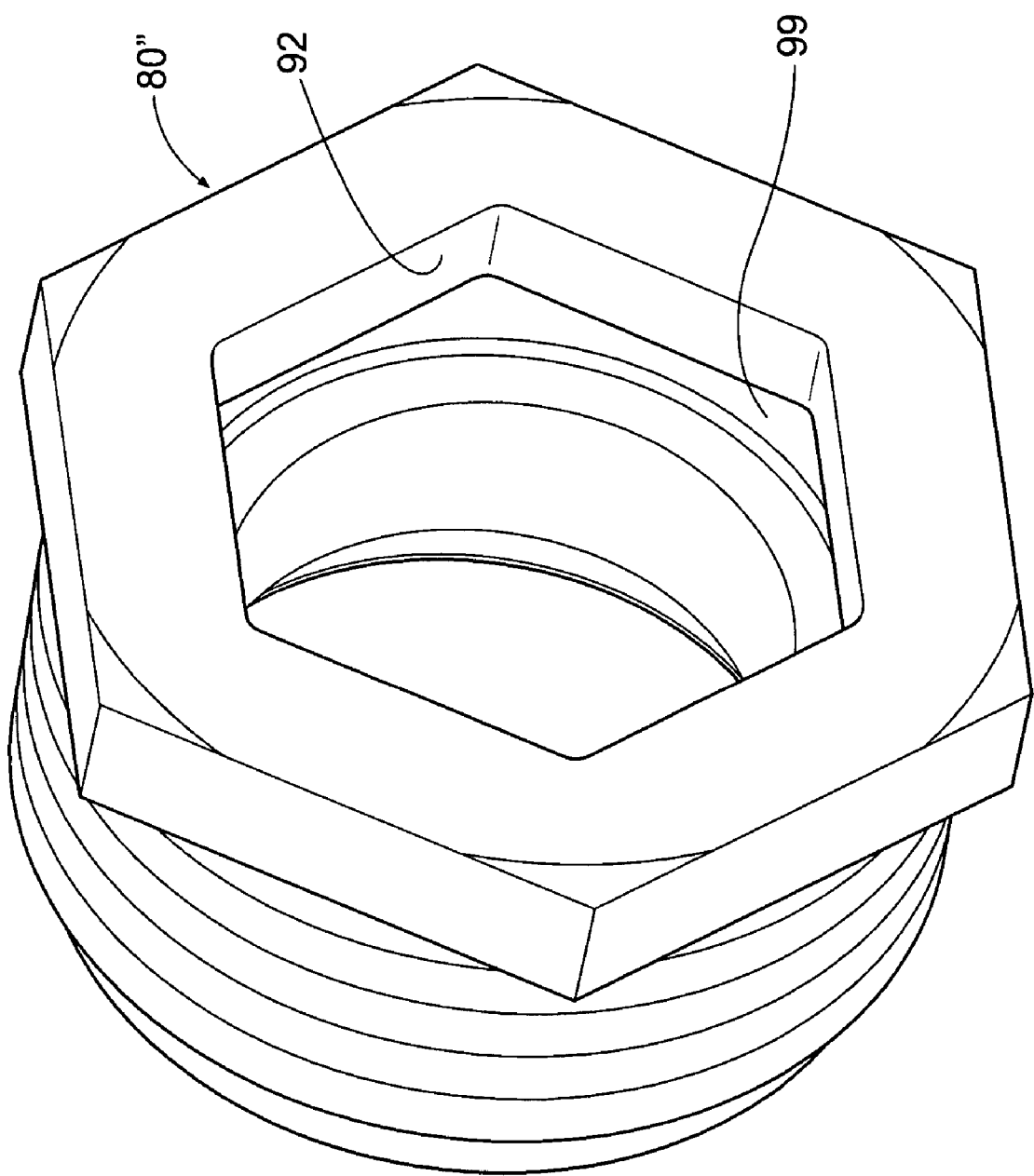
FIG. 18 is a perspective view of a stop nut for use in the quick connect coupling of FIG. 17.
Figure 19:
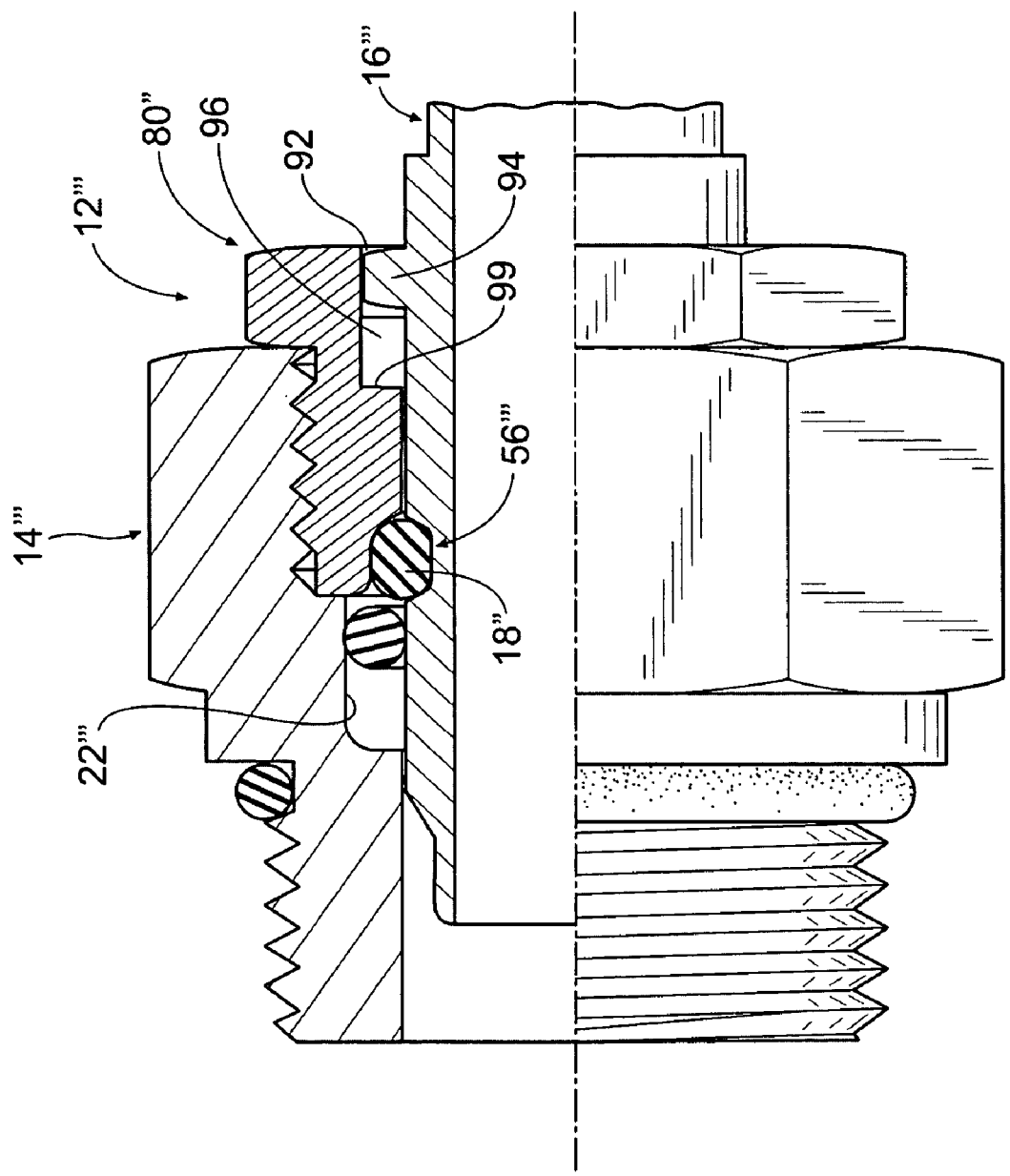
FIG. 19 is a side elevation, in partial cross-section, of the quick connect coupling of FIG. 17 coupled together.

Referring to FIGS. 17-19, a fitting 12''' according to another embodiment of the present invention is shown that is substantially similar to the embodiments shown in FIGS. 12-16. In addition to the features shown in FIGS. 12-16, a female member 14''' and a male member 16''' of fitting 12''' include a rotation inhibiting feature 90 adapted to inhibit rotation of the male member 16''' relative to the female member 14'''. In an embodiment, the rotation inhibiting feature 90 includes a polygonal-shaped opening 92 in the female member 14''' and a corresponding polygonal-shaped protrusion 94 on the male member 16''' that is sized to mate with the polygonal-shaped opening 92 when the male member 16''' or the female member 14''' is rotated to a predetermined angular position. The female member 14''' may also include a cavity 96 positioned between the polygonal-shaped opening 92 and the locking O-ring 18", which is sized to receive the polygonal-shaped protrusion 94 regardless of the angular orientation of the male member 14'''.

In the illustrated embodiment, the cavity 96 is slightly larger in diameter than the distance across corners of the polygonal-shaped opening 92, which permits the male member 16''' to rotate freely. The position of cavity 96 also corresponds with the position of the locking O-ring 18'' within the inwardly opening groove 22''' to permit the polygonal-shaped protrusion 94 to rotate when the locking O-ring 18'' is seated in the outwardly opening groove 56''' of the male member 16'''. The cavity 96 also allows disassembly of the stop nut 80'' without rotating the male member 16''' by pushing the male member 16''' further into the female member 14''' before removing the stop nut 80''. While the polygonal-shaped opening 92 and the cavity 96 are provided within the stop nut 80'' in the embodiment shown in FIGS. 17-19, it will be appreciated that the polygonal-shaped opening and the cavity may also be provided in the body of female member 14''' when the female member does not include a stop nut (see, e.g., FIGS. 1-3).

Receipt of the polygonal-shaped protrusion 94 into the polygonal-shaped opening 92 also provides a visual and tactical indication that the fitting 12''' is locked and may be under pressure. This feature prevents a user from disassembling the fitting 12''' before depleting the pressure. An interior edge 99 (FIGS. 18 and 19) of the cavity 96 may be used as a stop surface, which eliminates the need for a frusto-conical stop surface (such as surface 34 in FIG. 1) and reduces the manufacturing complexity of the female member 14'''. This feature is particularly useful when the female member 14''' is machined directly into a component, such as a pump or manifold, as opposed to being secured to a component using the threaded interface shown in FIGS. 12-19.

The female member 14''' illustrated in FIGS. 17-19 may also be configured to mate with male members that do not necessarily include a rotation inhibiting feature 90. For example, if the rotation inhibiting feature 90 is not required, the stop nut 80' may be manufactured without the polygonal-shaped opening 92, while retaining the cavity 96 sized to receive the polygonal-shaped protrusion 94 on the male member 16'''. This allows the use of the same male member configuration for all applications whether or not the anti-rotation feature is employed. Alternatively, the male member 16''' may be manufactured without the polygonal-shaped protrusion 94 to permit the male member 16''' to rotate when mated with the female member 14''' illustrated in FIGS. 17-19 or the female member 14' illustrated in FIGS. 12-16.

It will be appreciated that the anti-rotation feature 90 is not limited to the polygonal-shaped opening 92 and the polygonal-shaped protrusion 94 shown in FIGS. 17-19. Alternatively, the anti-rotation feature 90 may include other rotation inhibiting interfaces, including without limitation, cooperating splined surfaces on the male and female members.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A fitting comprising:
    a female member defining an inwardly opening groove;
    a stop nut threadedly engaged to the female member, the stop nut including a shoulder and a land;
    a sealing O-ring received in the inwardly opening groove;
    a male member received in the female member with a gap therebetween, the male member including an outwardly opening groove;
    a locking O-ring positioned between the outwardly opening groove in the male member and the shoulder and the land of the stop nut to prevent removal of the male member from the female member, wherein the O-ring is sufficiently compressed between the outwardly opening groove, the shoulder and the land alone to prevent removal of the male member from the female member; and
    wherein disengagement of the stop nut from the female member allows the male member to be removed from the female member.

2. The fitting of claim 1 wherein the locking O-ring is initially within the female member; the male member having a nose receivable through the locking O-ring, wherein when the male member is inserted into the female member, the locking O-ring sits in the outwardly opening groove of the male member to engage the shoulder of the stop nut when a longitudinal force is applied to separate the members.

3. The fitting of claim 1 wherein the male and female members are tubular and wherein the locking O-ring extends completely across the gap between the male and female members to form a seal therebetween precluding passage of fluid through the gap.

4. The fitting of claim 1 wherein the locking O-ring consists of a non-reinforced elastic polymer.

5. The fitting of claim 1, wherein the shoulder is generally frusto-conical in shape.

* * * * *